H. L. GRAY.
SEED SEPARATOR.
APPLICATION FILED JULY 23, 1917.

1,280,446.

Patented Oct. 1, 1918.
4 SHEETS—SHEET 1.

Witness
Ed. R. Lusby

Inventor
Harold L. Gray
By Jerry A. Mathews,
Attorney

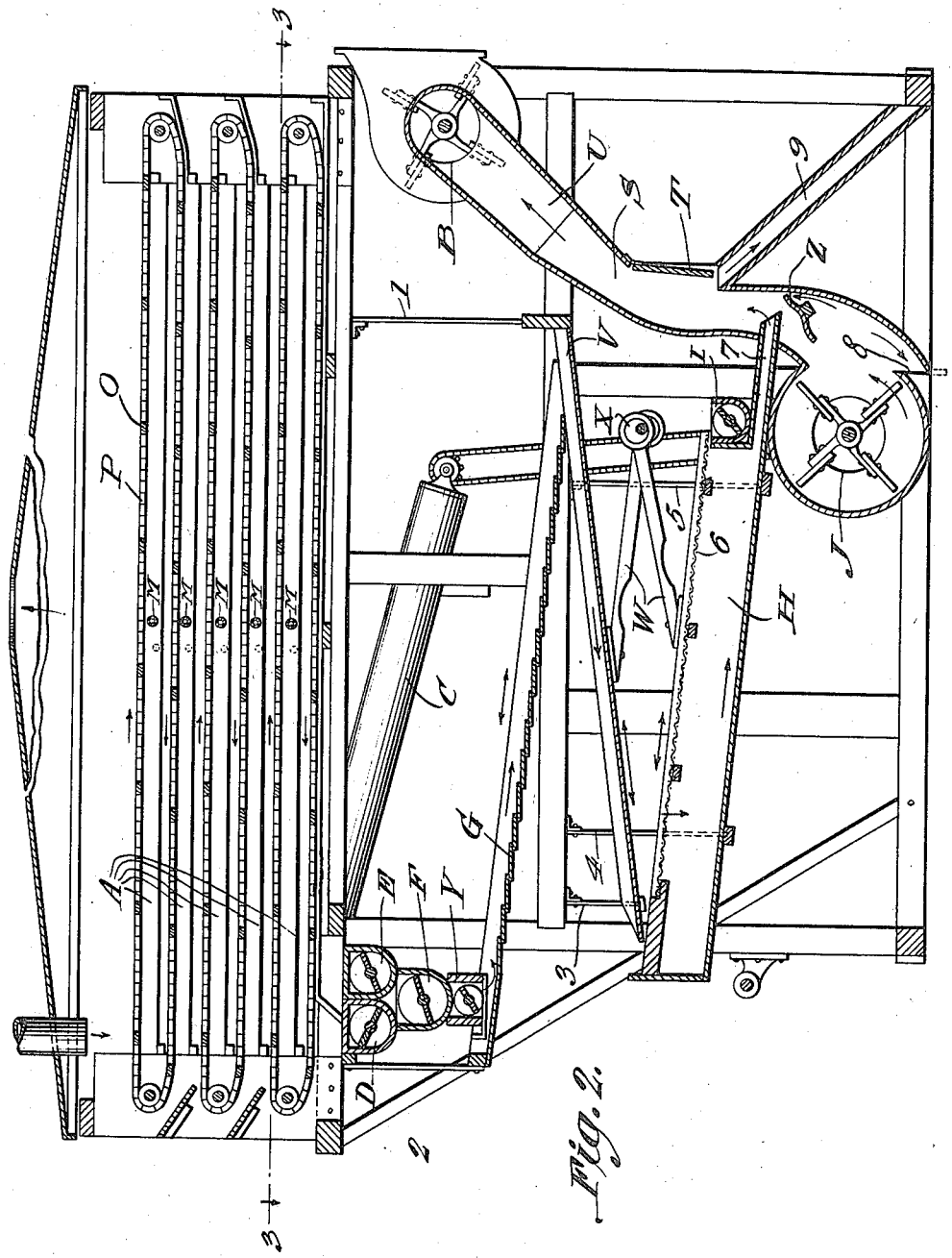

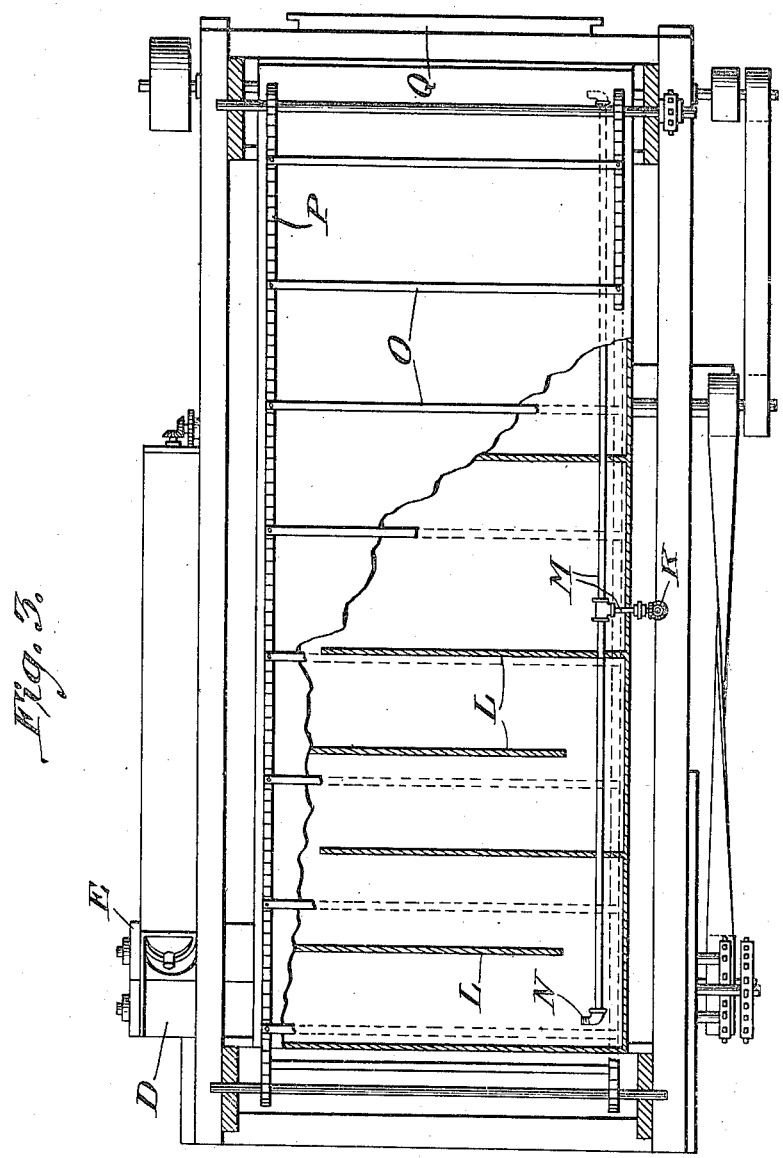

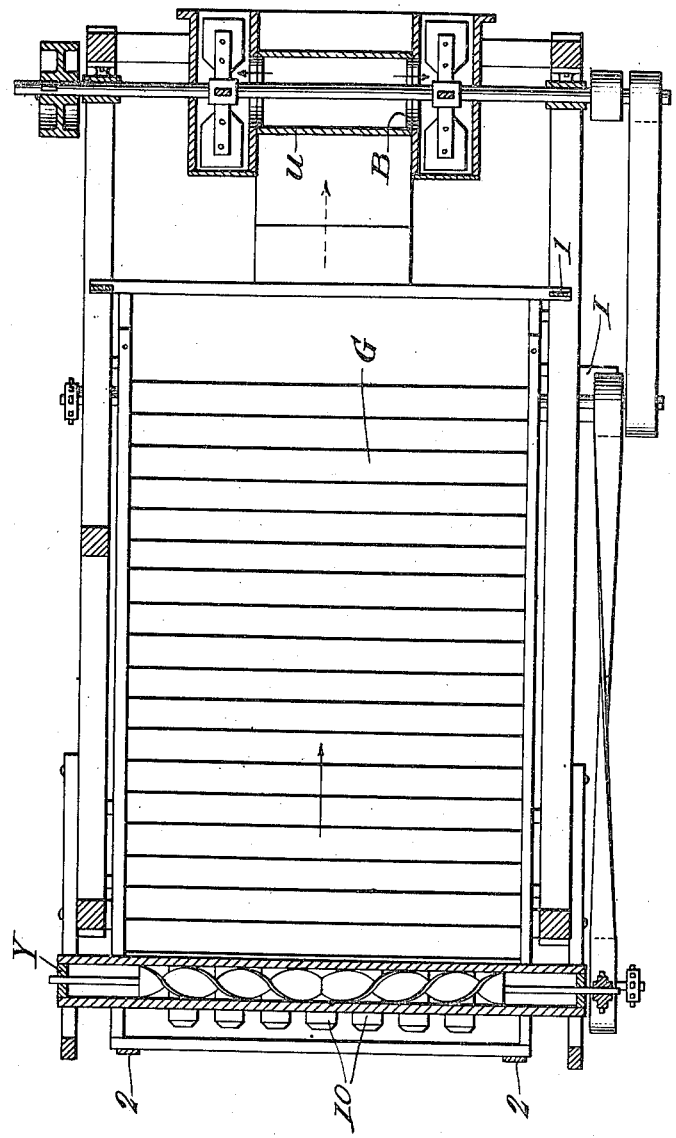

UNITED STATES PATENT OFFICE.

HAROLD LINE GRAY, OF CRAWFORDSVILLE, INDIANA, ASSIGNOR TO CRABBS REYNOLDS TAYLOR COMPANY, OF CRAWFORDSVILLE, INDIANA, A CORPORATION OF INDIANA.

SEED-SEPARATOR.

1,280,446.            Specification of Letters Patent.        Patented Oct. 1, 1918.

Original application filed May 18, 1917, Serial No. 169,540. Divided and this application filed July 23, 1917. Serial No. 182,327.

*To all whom it may concern:*

Be it known that I, HAROLD L. GRAY, a citizen of the United States, residing at Crawfordsville, in the county of Montgomery and State of Indiana, have invented new and useful Improvements in Seed-Separators, of which the following is a specification.

This application is a division of my pending application, Serial No. 169,540.

The object of my invention is to provide improvements in a seed separator for separating useful grain seeds, such as clover seed, from the seeds of noxious weeds such as buckhorn seed, which differ from clover seed in having a surface coating which becomes mucilaginous when moistened, and to which sawdust will adhere. It is an especial object of my invention to provide novel and improved means for moistening the sawdust, mixing it with the seed so that it will form a coating for the mucilaginous seed thereby producing a ball of larger size than the clover seed. With my new apparatus, the wet seed is thoroughly mixed first and given ample time for the water to set in the mucilaginous seed. It is then quickly dropped into hot sawdust and rapidly spread over an upper shaker shoe where it rolls over and over, the mucilaginous seed gathering into balls large enough to easily pass over screens with larger perforations, than has been possible with former methods.

It is further my object to provide a novel fanning arrangement utilizing an exhaust fan and a blower and a large sawdust collector. With the novel fanning construction which I have devised the separation of the sawdust from the seed is performed more effectively and the necessity for a second cleaning of the seed in a separate machine, which has heretofore been necessary, is now eliminated.

It is further my object to provide a novel construction and arrangement of shaker shoes and conveyers, which run more smoothly than the seed separating table heretofore used and make less noise and require less horse power.

It is further my object to provide a machine of novel construction so arranged as to greatly increase its capacity and permit of successful operation with less interference from unfavorable weather conditions.

It is an object of my invention to provide novel and improved means for drying the sawdust which is to be mixed with the seed.

It is further my object to provide a machine having a comparatively small number of parts, whereby to lessen the expense of construction and repairs.

With these and other objects in view, I provide the mechanism illustrated in the accompanying drawings, in which—

Fig. 2 is a vertical section of the entire machine;

Fig. 3 is a horizontal section on line 3—3 of Fig. 2, a portion being broken away to show the arrangement of members L; and Fig. 4 is a horizontal section on line 4—4 of Fig. 1.

Like characters of reference designate like parts throughout the several views.

Figure 1:
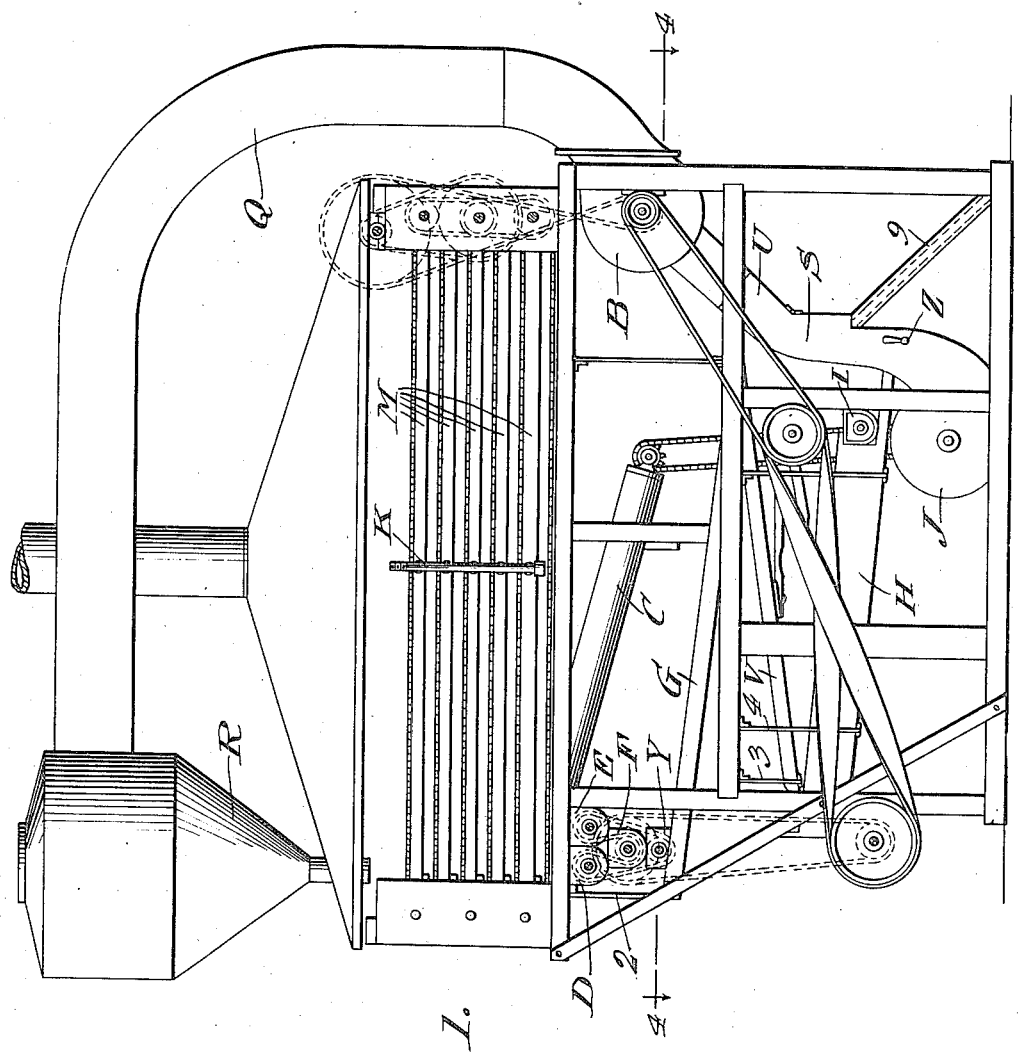
Figure 1 is a side elevation of the entire machine.

Referring to the accompanying drawings, I provide a pipe Q, through which the sawdust is blown to the dust collector R, from whence it is delivered to the pans A. There are a plurality of these pans arranged in superposed relation. I provide endless chains P which carry spaced cross bars O so disposed as to sweep over the pans as the endless chains are operated. I provide a steam pipe K through which steam is delivered to pipes M and thence through suitable nozzles N, whereby live steam is distributed over the pans A, diverting walls L being provided as shown in Fig. 3.

Members C, D, E, F, Y, and G, take the place of the separating table heretofore employed in seed separating machines of this type. The seed is fed into the lower end of conveyer C and mixed with water at this point. Conveyer C is mounted at an incline or angle of about thirty degrees. It empties into conveyer E, which also is a spiral conveyer. The sawdust from the lowest of the pans is delivered to conveyer D, also a spiral conveyer by which it is carried to one end and delivered to conveyer F, the seed in conveyer E similarly being delivered to conveyer F. Seed and sawdust are mingled in conveyer F and from it are delivered to conveyer Y. Conveyer Y differs from conveyers C, D, E and F in being a two-way conveyer, as illustrated in Fig. 4. The sawdust and seed which by this time are well mixed are dropped onto a novel shaker pan G of stepped construction, as shown in Fig. 2. From pan G the seed and sawdust are gradually shaken down to inclined platform V. In passing over shaker G, the mucilaginous seed gathers the sawdust about it so as to form small balls of considerably larger size than the clover seed. From member V the seed is delivered to a suitable grain shoe H. The seed which has collected the sawdust about it and is too large to pass through the screening 6 flows into a spiral conveyer 5, which carries it out of the machine. The smaller seed which is non-mucilaginous falls readily through the screen to the bottom of grain shoe H and flows through spout 7 into the pipe or conduit U. Members G and V are both supported by a flexible bar 1 at one end, while member G is supported by a flexible bar 2 at the other end and member V by a flexible bar 3, at the corresponding end which is the front of the machine. These members are suspended by flexible bars to permit of their being given a vibratory or shaking movement. Similarly, grain chute H is suspended from the frame of the machine by flexible bars 4 and 5. A vibratory movement to members G, V and H is communicated by eccentric rods W, preferably shaped as shown in Fig. 2, which are operated by eccentrics X, as illustrated in Fig. 2.

Referring to Fig. 2, there is illustrated novel means for separating the sawdust and seed and for returning the sawdust to the dust collector R and thence to the pans A where it is used over again. I provide a pipe U, at the lower end of which is a blower fan J driven at such speed as to force a current of air that will carry the sawdust and seed up the pipe to approximately the portion designated S. At this point the driving force of the blower is superseded by the suction from an exhaust fan B disposed in the upper portion of pipe U, as illustrated in the drawings. A suitable valve T is provided in pipe U immediately below the narrow portion S of pipe U, and just above a discharge chute 9 opening out of pipe U. I also provide a suitable valve or vane Z, the primary function of which is to aid in the separation of seeds. Valves Z and T may be adjusted by any suitable means such as by projecting knobs or handles. The force of the current of air through pipe U is regulated so that the seeds of medium weight will be carried by the air current from the blower to a height sufficient so that they will fall back into discharge chute 9, whereas the sawdust, being lighter, is sucked up by the exhaust fan B and swept along to the dust collector R. A separation of the heavier material is effected by valve z and it drops into conduit 8.

The operation of the machine has been described in connection with the foregoing explanation of its construction. By providing the series of superposed pans, the capacity of the machine has been greatly increased. The fact of using screens with larger perforations and the employment of my improved method of mingling the seed and sawdust has also made it possible to operate on a much larger quantity of seed than heretofore. The shaker shoes and conveyers which have taken the place of the table employed in former seed separating machines provide an important improvement in that they run twice as smoothly, with very little noise and require less horse power. The employment of the novel arrangement of a combined blower and exhaust fan makes it possible to effect a more complete and thorough separation of seed from sawdust. With the new method, the wet seed is thoroughly mixed first and given ample time for the water to set in the mucilaginous seed. It is then quickly dropped into hot sawdust and rapidly spread over the upper shaker platform where it rolls over and over from step to step downwardly. This enables the mucilaginous seed to collect about it a coating of sawdust so as to form balls large enough to easily pass over the screen which has larger perforations than has been possible with former machines, thus causing a more effective separation of the useful non-mucilaginous clover seed from the mucilaginous and undesirable buckhorn and other weed seeds. Hot dry sawdust is delivered directly from the end of the lower steam pan to the conveyer in hot condition, without exposure to a lower or outside temperature, the conveyer being positioned in immediate communication with the end of the bottom pan, as illustrated in the drawings. The absorbent properties of the sawdust are thus retained in their highest degree, instead of being lost as is the case when the sawdust dropped such a distance as to subject it to a lower temperature. The action of the shaking platform causes the seed to roll and slide down the inclined platforms when it drops from the conveyers in a hot mixed condition. In rolling over the platforms each mucilaginous seed forms an individual ball to itself with enough sawdust covering the grain from the very start to prevent any good seed adhering to it. As this action is taking place the good, heavy clover (or other) seed works toward the bottom of the inclined shoe while the mucilaginous seed, now almost covered with fine sawdust, stratifies itself in a layer with the fine sawdust at the top of the moving layer of seed. This gives the mucilaginous seed an unlimited supply of dry sawdust and consequently enlarges the size of the individual balls. Consequently a screen with large perforations may be used, which increases the capacity of the machine accordingly.

What I claim is:

1. In a seed separating machine, the combination of an inclined conveyer into the lower end of which seed and water are fed, a seed conveyer into one end of which the first named conveyer empties, a sawdust conveyer in proximity to the seed conveyer, a conveyer positioned beneath the aforesaid conveyers and into which they empty, and a two way conveyer positioned below the latter conveyer and into the central portion of which the aforesaid conveyer empties, whereby seed is delivered from opposite ends of the two way conveyer, and shaking means into which the two-way conveyer empties and which completes the operation of separating mucilaginous from non-mucilaginous seed.

2. In a seed separating machine, the combination of a seed conveyer, a sawdust conveyer, a conveyer into which the aforesaid conveyers empty, and a two-way conveyer into the central portion of which the last named conveyer empties the mingled seed and sawdust, substantially as described and for the purposes specified.

3. In a seed separating machine the combination of an inclined conveyer into the lower end of which wet seed is fed, a conveyer into which the wet seed is delivered, a conveyer into which hot sawdust is delivered, a conveyer positioned below the last named conveyers and into one end of which seed and sawdust are delivered, and a two way conveyer into the central portion of which the last named conveyer empties for the purposes specified.

4. In a seed separating machine, means for mingling seeds and sawdust, comprising a seed conveyer, a sawdust conveyer, an inclosed combined seed and sawdust conveyer into one end of which the two first named conveyers empty, and a two-way conveyer into the central portion of which the third named conveyer empties.

5. In a seed separating machine, the combination of means for heating sawdust, a conveyer into which the hot sawdust is delivered, seed conveyers into which wet seed is delivered, a conveyer into which the seed and sawdust conveyers empty, and conveying means for further mingling the wet seed and hot sawdust, substantially as described.

6. In a seed separating machine, the combination of means for heating sawdust, a conveyer into which the hot sawdust is delivered, conveyers into which wet seed is fed, a conveyer into which the aforesaid conveyers empty to mingle the seed and sawdust, a second conveyer by which the mingled seed and sawdust is delivered to opposite portions of a shaking element, a shaking element for separating non-mucilaginous seed from the seed to which the sawdust adheres, and means for returning the sawdust to the said sawdust heating means.

7. In a seed separating machine, the combination of means for heating sawdust, a conveyer into which the hot sawdust is delivered, conveying means for mingling wet seed with the hot sawdust without exposure to the outside atmosphere until thoroughly mixed, shaking means to opposite sides of which the mingled seed and sawdust are delivered, and means for returning the sawdust to the said sawdust heating means, substantially as set forth.

8. In a machine for separating mucilaginous seeds from other seeds, an inclined conveyer into the lower end of which wet seeds are supplied, means for drying an absorbent material, inclosed conveying means for mingling and conveying the wet seed and absorbent material, inclined vibratory means for separating the mucilaginous from the non-mucilaginous seeds, whereby the conveying of and mingling the wet seeds and hot sawdust is performed within inclosed apparatus and a complete separation of the seeds effected on the shaking means.

9. In a machine for separating mucilaginous seeds from non-mucilaginous seeds, an inclined conveyer for moistening seeds, means for drying an absorbent material, conveyers into which hot sawdust and wet seeds are fed from the aforesaid means to thoroughly mingle same without exposure of the absorbent material to the air, and vibratory inclined stepped tables for separating the two classes of seeds.

10. In a seed separating machine, the combination of means for thoroughly mingling wet seed and dry sawdust, a vibrating stepped inclined platform positioned in immediate communication with the seed and sawdust mingling apparatus to mix and roll the material and cause the sawdust to gather in balls about the mucilaginous seeds, a second vibratory platform to which the mingled seed and sawdust are fed, an inclined grain shoe into which the second vibratory platform empties, said grain shoe having screening with relatively large perforations, and means for continuously vibrating the platforms and grain shoe, arranged substantially as shown and for the purpose of separating mucilaginous from non-mucilaginous seeds.

11. In a seed separating machine, the combination of inclosed apparatus for mingling seed and sawdust, a vibrating stepped inclined platform having its upper end positioned in immediate communication with the aforesaid seed and sawdust mingling apparatus to mix and roll the material and cause the sawdust to gather in balls about the mucilaginous seeds, an inclined grain shoe into which the seed and sawdust in mingled condition flows, said grain shoe having screening having relatively large perforations to increase its capacity, and means for shaking the platforms and grain shoe, arranged substantially as shown and for the purpose of separating mucilaginous from non-mucilaginous seeds.

12. In apparatus of the class described, the combination of inclosed apparatus for thoroughly mingling wet seed and dry sawdust and delivering them to shakers without exposure to lower temperatures, shaker pans in communication with the aforesaid apparatus to mix and roll the material and cause the sawdust to gather in balls about the mucilaginous seeds, an inclined grain shoe into which the said shaker pans empty, means for vibrating the shakers and grain shoe, a conveyer to receive material which fails to pass through the screening of the grain shoe, and means for the discharge of material from the lower portion of the grain shoe, arranged substantially as shown and for the purpose of separating mucilaginous from non-mucilaginous seeds.

13. In a seed separating machine, a stepped slantingly-positioned vibrating platform to mix and roll the material and cause the sawdust to gather in balls about the mucilaginous seeds, an oppositely inclined platform into which the stepped platform empties, an inclined grain shoe into which the second platform empties, means for continuously vibrating the platform and grain shoe, and means for the separate discharge of the lighter and the heavier material from the grain shoe, arranged substantially as shown and for the purposes described.

14. In apparatus of the class described, the combination of inclosed apparatus for thoroughly mingling wet seed and hot dry sawdust without exposure to lower outside temperatures, successive inclined platforms arranged to convey the mingled seed and sawdust to a grain shoe, a grain shoe, and means for vibrating the aforesaid platforms and grain shoe to cause the mucilaginous seed to gather about it relatively large balls of sawdust and entirely separate from non-mucilaginous seed in passing over the grain shoe, arranged substantially as shown.

15. In a seed separating machine, the combination of a slantingly positioned vibrating platform having its upper end positioned to receive mingled seed and sawdust in mingled condition before exposure to outside atmosphere, to mix and roll the material and cause the sawdust to gather in balls about the mucilaginous seeds, a second oppositely arranged vibratory platform into which the first platform empties, an inclined grain shoe into which the second vibratory platform empties, said grain shoe having screening having relatively large perforations, and means for continuously vibrating the aforesaid grain shoe and platforms, for the purpose described.

HAROLD LINE GRAY.